United States Patent

Sadegh et al.

[11] Patent Number: 5,370,359
[45] Date of Patent: Dec. 6, 1994

[54] MANUAL SEAL COUPLER

[75] Inventors: Ali M. Sadegh, Closter; Michael M. Barjasteh, Rockaway, both of N.J.

[73] Assignee: Mastercool, Inc., Rockaway, N.J.

[21] Appl. No.: 148,823

[22] Filed: Nov. 4, 1993

[51] Int. Cl.⁵ .................................... F16L 37/28
[52] U.S. Cl. ........................ 251/276; 137/614.15; 137/614.19; 137/614.21
[58] Field of Search ............... 251/149.1, 149.3, 276, 251/275, 278; 137/614.03, 614.04, 614.05, 614.15, 614.19, 614.21

[56] References Cited

U.S. PATENT DOCUMENTS

| | | | |
|---|---|---|---|
| 1,762,178 | 6/1930 | Lear | 251/276 X |
| 2,594,539 | 4/1952 | Brown | 251/278 X |
| 3,733,048 | 5/1973 | Hiszpanski | 251/278 X |
| 3,791,412 | 2/1974 | Mays | 137/614.19 X |
| 4,527,587 | 7/1985 | Fairlamb | 137/614.19 X |
| 5,139,049 | 8/1992 | Jensen et al. | 137/614.05 |
| 5,244,010 | 9/1993 | Barjasteh et al. | 137/614.03 X |

Primary Examiner—Martin P. Schwadron
Assistant Examiner—Kevin L. Lee
Attorney, Agent, or Firm—Mathews, Woodbridge & Collins

[57] ABSTRACT

A coupler for connecting the service port of a refrigeration fluid-containing system to an exit conduit has a stem threadably for axial movement within the coupling body between a first open position when fully advanced and a second closed position when fully retracted. A plunger axially extends from sealing means in the stem into a service port collar and unseats spring biased sealing means, permitting passage of refrigeration fluid, when the stem is in a substantially fully advanced position and the service port of a refrigeration fluid-containing system is positioned in a service port collar. When the stem is threadably retracted from a substantially fully advanced position, the plunger assumes a retracted position insufficient to unseat the spring biased sealing means and thereby prevents passage of refrigeration fluid.

7 Claims, 4 Drawing Sheets

MANUAL SEAL COUPLER

BACKGROUND OF THE INVENTION

The present invention relates to a coupler for connecting the service port of a system containing refrigeration fluid to an exit conduit.

Regulations of the U.S. Environmental Protection Agency (EPA) now mandate the use of difluoromethane, a refrigerant known as R-134A, or HFC-134, in place of dichlorodifluoromethane, known as Freon 12 or R-12. Even though this new refrigerant is believed to minimize ozone depletion, it nevertheless may not be released into the atmosphere but must be removed, collected, and recycled in a closed system.

Refrigerant fluid typically is removed through one or more service ports directly before or after the compressor stage of a refrigeration system. Conventional fittings, adapters and couplings have been used for connecting and disconnecting recycling machines to the tubular high or low-side service ports of air conditioning systems. Recently the Society of Automotive Engineers, EPA, and automotive manufacturers have recommended that service ports of automotive air conditioners be provided with special quick connect/disconnect ports which prevent refrigerant from escaping into the atmosphere. In order to comply with this requirement, manufacturers have begun to make couplings and fittings to comply with the requirements of the SAE, EPA and auto manufacturers.

U.S. Pat. Nos. 4,667,925; 4,756,558; 4,913,467; 5,046,523 and 5,069,424 describe typical devices. Common assigned U.S. Pat. No. 5,244,010, the contents of which are incorporated herein by reference, describes an improved coupler for refrigeration systems which seals the connection between a service port and the coupler before the apparatus is in a snap-on and lock mode, thereby making it safe and environmentally sound. The referenced device locks the connection through a snapping action while the coupling operation is in progress. Moreover, the referenced device is light, easy to use, and relatively small, so that it can be used in confined spaces such as in an automobile engine compartment, and can be disconnected quickly with an absolute minimum of refrigerant leakage.

Because the service port is used for both introducing and removing refrigeration fluids, it is desirable if the coupling device can accommodate a variety of conduits at the exit port, as for example those used for recycling refrigeration fluids and those used for introducing fresh (or recycled) refrigeration fluids, and to do so while the coupler is locked on the service port of the refrigeration unit. It also is desirable to have better control of the flow of refrigerant and to increase safety. To accomplish these ends, the device should be capable of being sealable (so as to prevent loss of fluid while changing conduits) while also preventing loss when the coupler is removed, either intentionally or accidentally, from the service port of the refrigeration system.

SUMMARY OF THE INVENTION

Briefly described, the invention comprises a coupler for connecting the service port of a refrigeration fluid-containing system to an exit conduit. The coupler has a stem threadably mounted within or without the body of the coupler for axial movement between a first "open" position when fully advanced and a second "closed" position when fully retracted. A plunger axially extends from sealing means in the stem into a service port collar and unseats spring biased sealing means, permitting passage of refrigeration fluid when the stem is in a substantially fully advanced position and the service port of a refrigeration fluid-containing system in positioned in a service port collar. When the stem is threadably retracted from the substantially fully advanced position, the plunger assumes a retracted position insufficient to unseat the spring biased sealing means and thereby prevents passage of refrigeration fluid.

DETAILED DESCRIPTION

Figure 1:
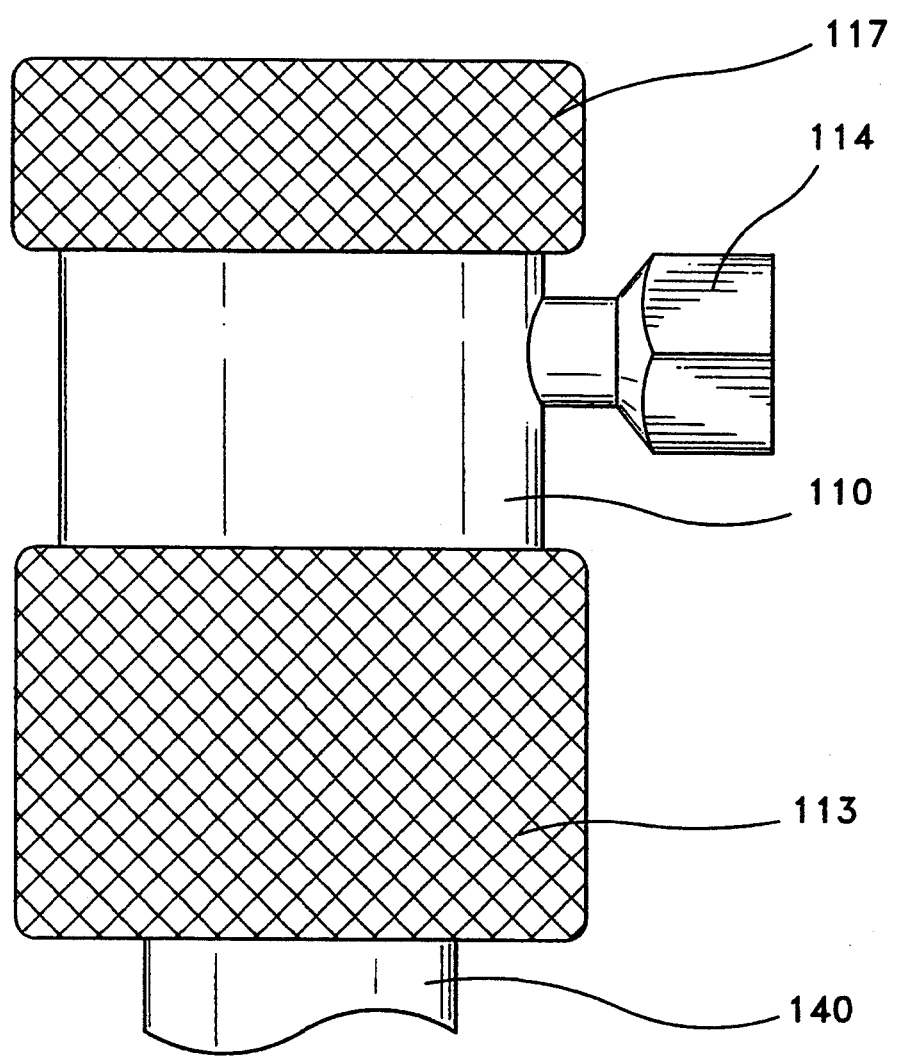
FIG. 1 is an elevational view of a first embodiment of the coupler.
Figure 2:
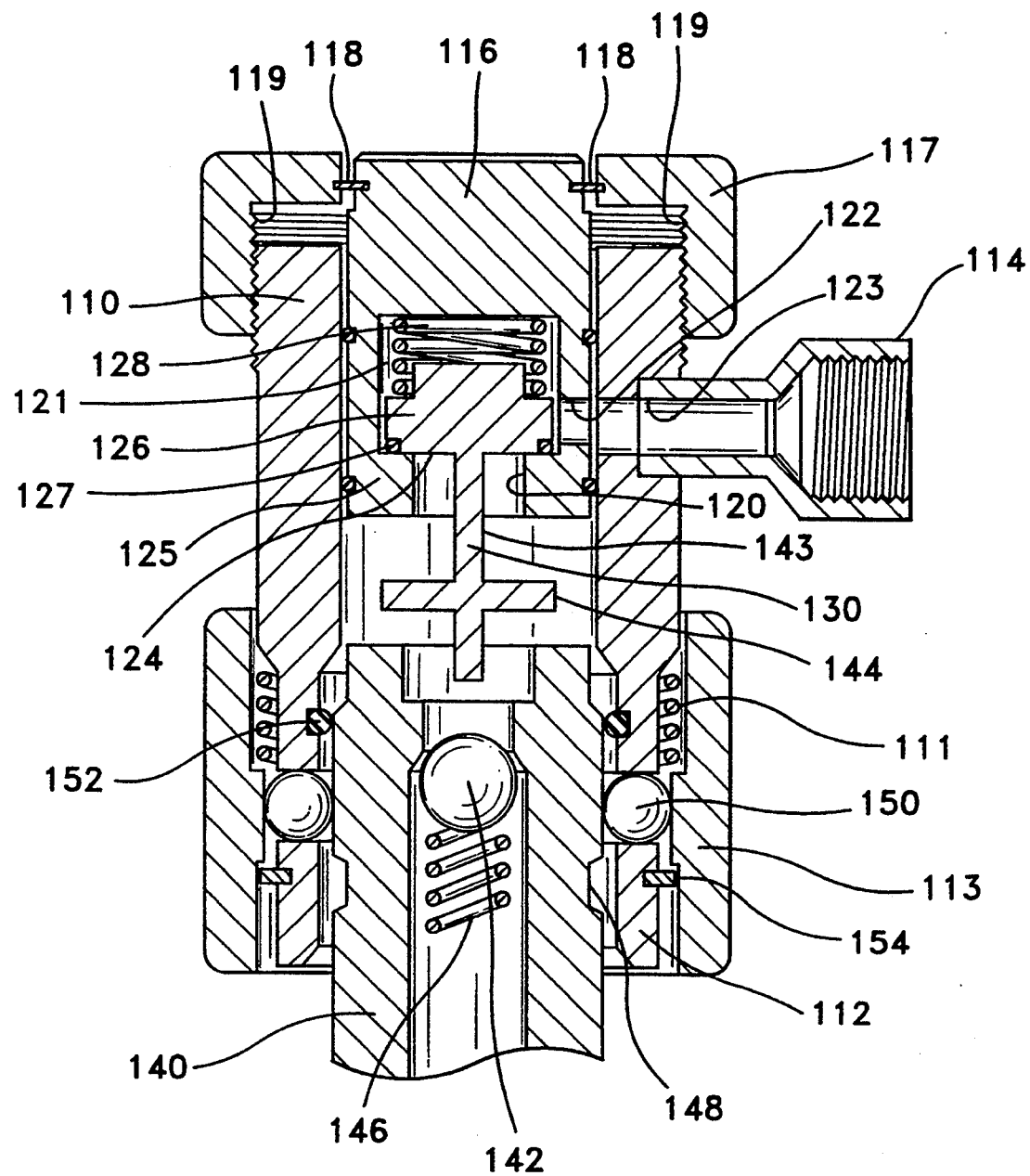
FIG. 2 is a cross-section of the first embodiment of the coupler shown in FIG. 1, also showing a typical service port of a refrigeration fluid-containing system.
Figure 3:
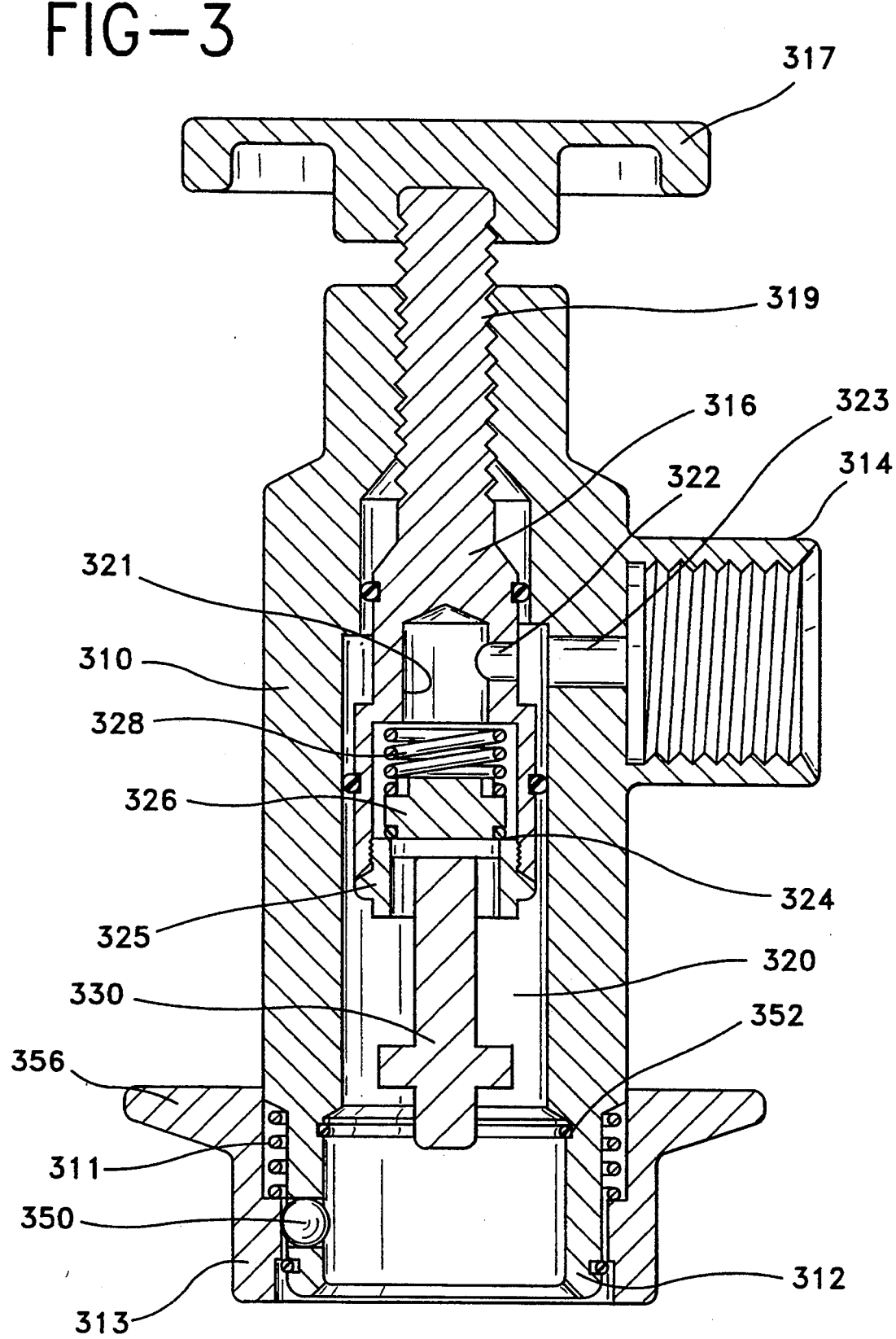
FIG. 3 is a cross-section of a second embodiment of the coupler.
Figure 4:
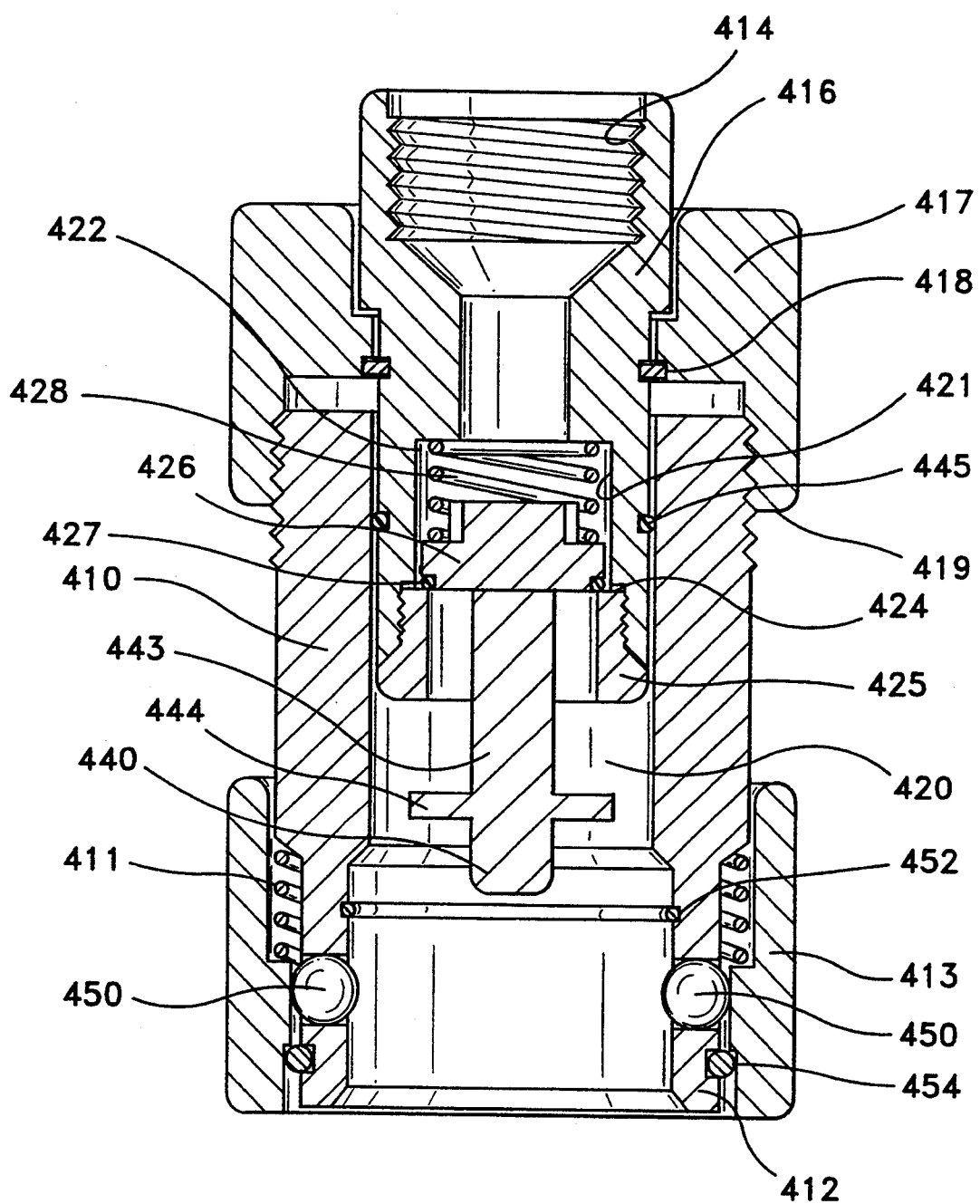
FIG. 4 is a cross-section of a third embodiment of the coupler.

The last two digits of three digit reference numbers are used to illustrate analogous elements, those in FIGS. 1 and 2 being preceded by a "1", those in FIG. 3 being preceded by a "3", and those in FIG. 4 being preceded by a "4".

Referring to FIGS. 1 and 2, the coupler has an elongated coupling body 110. A hollow axially aligned service port collar 112 is disposed at one end of coupling body 110. Service port collar 112 is operable to sealably receive the service port of the refrigeration fluid-containing system in fluid-tight relationship. This can be accomplished through use of a conventional snap-connector which communicates with and locks onto either the high or low-side of the compressor stage of the refrigeration system in accordance with published standards, e.g., SAE, EPA, and automotive manufacturers.

A hollow exit collar 114 is proximate the other end of coupling body 110. Exit collar 114, which can be screwed into coupling body 110 or forged as part of coupling body 110, is laterally aligned to the major axis of coupling body 110 and is operable to sealably receive an exit conduit in fluid-tight relationship. This can be threaded or utilize a conventional snap-connector.

It should be appreciated that the identification of collars 112 and 114 as a service port collar and exit collar, respectively, is simply for convenience since the device also can be used during the charging operation in which case the service port collar 112 in fact becomes the "exit" collar.

Disposed within coupling body 110 is stem 116. Stem 116 terminates in handle 117, being retained by flat spring ring 118, and is threadably attached to coupling body 110 for axial movement between a first "open" position when fully advanced and a second "closed" position when fully retracted. The coupling assumes a normally closed configuration. Stem 116 is threadably mounted on threads 119 on the interior of coupling body 110.

Stem 116 has an axially aligned, elongated cylindrical chamber 118 defined therein. Means 120 are providing for fluid communication between cylindrical chamber 121 and service port collar 112. Means 122 and 123 also are provided for fluid communication between cylindrical chamber 121 and exit collar 114. O-rings 145 and 147 seal stem 116 between service port collar 112 and exit collar 114.

A seat surface 124 is circumferentially and inwardly defined on the inside wall of cylindrical chamber 121 between exit collar communication means 122 and service port collar communication means 120. For convenience of fabrication, seat surface 124 can be defined on annular insert 125.

Sealing means 126, typically embodying an O-ring 127, are disposed within cylindrical chamber 121 between exit collar communication means 122 and seat surface 124. Sealing means 126 complement seat surface 124 so as to provide a substantially fluid-tight seal between exit collar communication means 122 and service port collar communication means 120.

Spring means 128, also disposed within cylindrical chamber 121, bias sealing means 126 against seat surface 124 into a normally closed position, thereby preventing fluid communication between the refrigeration fluid-containing system and the exit conduit.

The coupler of the present invention is designed to operate upon service port 140 of a refrigeration fluid-containing system. Sealing ball 142 is biased by spring 146 within the body of service port 140.

Coupling body 110 is provided with outer body 113 biased by spring 111. Metal stop ring 154 retains outer body 113 on coupling body 110. A plurality of locking balls 150 are set within coupling body 110 and snap-in into detent 148 defined in service port 140 when outer body 113 is retracted, thereby preventing the coupler from blowing off during installation, charging, or discharging. O-ring 152 seals service port 140 when inserted in service port collar 112.

A rigid plunger 130 extends axially from sealing means 126 into service port collar 112. Rigid plunger 130 is operable, when stem 116 is in substantially fully advanced position within coupling body 110, to engage spring biased sealing ball 142 within service port 140 of a refrigeration fluid-containing system in service port collar 112. Rigid plunger 130 also is operable, when stem 116 is in substantially fully advanced position, to unseat biased sealing means 126, thereby permitting fluid communication between the refrigeration fluid-containing system and the exit conduit. Rigid plunger 130 assumes a retracted position which is insufficient to unseat biased sealing means 126 when stem 116 is threadably retracted from a substantially fully advanced position so that fluid communication between the refrigeration fluid-containing system and the exit conduit is prevented. Preferably plunger 130 has an axially aligned shaft 143 and laterally aligned cross bar 144.

Referring to FIG. 3, the coupler has an elongated coupling body 310 with axially aligned service port collar 312, operable to sealably receive in fluid-tight relationship the service port (not shown in FIG. 3) of a refrigeration fluid-containing system, disposed at one end. This can be accomplished through use of a snap-connector as discussed with respect to FIGS. 1 and 2 which communicates with and locks onto either the high or low-side of the compressor stage of the refrigeration system. Coupling body 310 thus is provided with outer body 313 biased by spring 311. In the embodiment shown in FIG. 3, outer body 313 is provided with a radially outwardly extending lip or rim 356 which permits retraction of outer body 313 with one hand, analogously to a hypodermic syringe.

Hollow exit collar 314, which is laterally aligned to the major axis of coupling body 310 and operable to sealably receive an exit conduit in fluid-tight relationship, is proximate the other end of coupling body 310. Again this can utilize a conventional snap-connector.

Stem 316 is threadably mounted on threads 319 on the interior of coupling body 310 for axial movement between a first "open" position when fully advanced and a second "closed" position when fully retracted and terminates in handle 317.

Stem 316 has an axially aligned, elongated cylindrical chamber 321 defined therein. Means 320 are providing for fluid communication between cylindrical chamber 321 and service port collar 312 as well as means 322 and 323 for fluid communication between cylindrical chamber 321 and exit collar 314.

A seat surface 324, which can be defined on annular insert 325, is circumferentially and inwardly disposed on the inside wall of cylindrical chamber 321 between exit collar communication means 322 and service port collar communication means 320. Sealing means 326 providing a substantially fluid-tight seal are disposed within cylindrical chamber 321 between exit collar communication means 322 and seat surface 324. Spring means 328 bias sealing means 326 against seat surface 324 into a normally closed position and prevent fluid communication between the refrigeration fluid-containing system and the exit conduit.

A rigid plunger 330 extends axially from sealing means 326 into service port collar 312. As in FIGS. 1 and 2, rigid plunger 330 is operable, when stem 316 is in substantially fully advanced position within coupling body 310, to engage the service port of a refrigeration fluid-containing system in service port collar 312 and unseat biased sealing means 326, thereby permitting fluid communication between the refrigeration fluid-containing system and the exit conduit, but to assume a retracted position insufficient to unseat biased sealing means 326 when stem 316 is threadably retracted from a substantially fully advanced position.

Referring to FIG. 4, the coupler has an elongated coupling body 410 with axially aligned service port collar 412 disposed at one end thereof. Coupling body 410 is provided with outer body 413 biased by spring 411. Metal stop ring 454 retains outer body 413 on coupling body 410. A plurality of locking balls 450 are set within coupling body 410 and snap-in into a detent (not shown in FIG. 4) defined in service port when outer body 413 is retracted, thereby preventing the coupler from blowing off during installation, charging, or discharging. O-ring 452 seals service port when inserted in service port collar 412.

A hollow exit collar 414, operable to sealably receive an exit conduit in fluid-tight relationship, is proximate the other end of but axially aligned to the major axis of coupling body 410.

Disposed within coupling body 410 is stem 416. Handle 417, which is disposed circumferentially about exit collar 414, is rotatably mounted on stem 416 through flat spring ring 418 and threaded to threads 419 on the exterior of coupling body 410 for axial movement of stem 416 between a first "open" position when fully advanced and a second "closed" position when fully retracted.

Stem 416 has an axially aligned, elongated cylindrical chamber 421 defined therein. Means 420 are providing for fluid communication between cylindrical chamber 421 and service port collar 412. Means 422 also are provided for fluid communication between cylindrical chamber 421 and exit collar 414.

A seat surface 424 is circumferentially and inwardly defined on the inside wall of cylindrical chamber 421 between exit collar communication means 422 and service port collar communication means 420. For convenience of fabrication, seat surface 424 can be defined on annular insert 425.

Sealing means 426 including O-ring 427 are disposed within cylindrical chamber 421 between exit collar communication means 422 and seat surface 424 and provide a substantially fluid-tight seal between exit collar communication means 422 and service port collar communication means 420.

Spring means 428, also disposed within cylindrical chamber 421, bias sealing means 426 against seat surface 424 into a normally closed position, thereby preventing fluid communication between the refrigeration fluid-containing system and the exit conduit. Only a single O-ring 445 is required in this configuration to seal cylindrical chamber 421 and service port collar 412.

A rigid plunger 430 extends axially from sealing means 426 into service port collar 412. Rigid plunger 430 is operable, when stem 416 is in substantially fully advanced position within coupling body 410, to engage the service port of a refrigeration fluid-containing system in service port collar 412 and unseat biased sealing means 426, thereby permitting fluid communication between the refrigeration fluid-containing system and the exit conduit. Rigid plunger 430 assumes a retracted position which is insufficient to unseat biased sealing means 426 when stem 416 is threadably retracted from a substantially fully advanced position so that fluid communication between the refrigeration fluid-containing system and the exit conduit is prevented.

As is apparent from the foregoing, the coupling device can be connected to a service port of a refrigeration fluid-containing system. The manner of this connection provides an initial measure of safety since O-ring 152, 352, 452 provides a seal between the service port and the atmosphere before plunger 130, 330 430 can engage the sealing ball of the service port. Thereafter the coupling device can be selectively opened and closed, permitting exchange of exit and recharge conduits without loss of refrigerant fluid.

Passage of fluid is possible only when both of two conditions are satisfied: a service port must be locked into the service port collar so that the plunger can contact the service port and the stem must be in a fully advanced position. Only when both conditions are satisfied, so that the distance between sealing means 126, 326, 426 and a sealing ball of a locked service port is less than the length of rigid plunger 130, 330, 430, can fluid pass through the coupler.

If the coupler is inadvertently disengaged while stem 116, 316, 416 is fully extended in an open position (proper disengagement has the stem fully retracted), plunger 130, 330, 430 loses contact with the service port and spring means 128, 328, 428 urge sealing means 126,, 326, 426 against seat surface 124, 324, 424, thereby preventing loss of fluid.

Moreover if the coupler is inadvertently left in an open position, that is if stem 116, 316, or 416 is in substantially fully advanced position, attempted engagement of a service port will be met with resistance as result of the extended position of rigid plunger 430 within service port collar 412. While obviously this resistance can be overcome, the force required to do so should give warning that stem 116, 316, or 416 is in an advanced or open position.

What is claimed is:

1. A coupler for connecting the service port of a refrigeration fluid-containing system to an exit conduit, said apparatus comprising:
    (i) an elongated coupling body having
        (a) a hollow axially aligned service port collar disposed at one end of said coupling body and operable to sealably receive the service port of the refrigeration fluid-containing system in fluid-tight relationship, and
        (b) a hollow exit collar proximate the other end of said coupling body and operable to sealably receive said exit conduit in fluid-tight relationship;
    (ii) a stem threadably attached to the coupling body for axial movement within the coupling body between a first open position when fully advanced and a second closed position when fully retracted, said stem having
        (a) an axially aligned elongated cylindrical chamber defined within said stem,
        (b) means communicating between said cylindrical chamber and said service port collar,
        (c) means communicating between said cylindrical chamber and said exit collar, and
        (d) a seat surface circumferentially and inwardly defined on the inside wall of the cylindrical chamber between said exit collar communication means and said service port collar communication means;
    (iii) sealing means disposed within the cylindrical chamber between said exit collar communication means and said seat surface and complementing the seat surface so as to provide a substantially fluid-tight seal between the exit collar communication means and the service port collar communication means;
    (iv) spring means biasing the sealing means against the seat surface into a normally closed position; and
    (v) a rigid plunger axially extending from said sealing means into said service port collar and operable when said stem is in substantially fully advanced position within the coupling body to engage the service port of a refrigeration fluid-containing system in said service port collar and unseat said biased sealing means while assuming a retracted position insufficient to unseat said biased sealing means when said stem is threadably retracted from a substantially fully advanced position.

2. A coupler according to claim 1 wherein said hollow exit collar is laterally aligned on said coupling body.

3. A coupler according to claim 1 wherein said hollow exit collar is axially aligned on said coupling body.

4. A coupler according to claim 1 wherein said stem is threadably mounted on the interior of said coupling body.

5. A coupler according to claim 1 wherein said stem is threadably mounted on the exterior of said coupling body.

6. A coupler according to claim 1 wherein said plunger has a lateral cross-member.

7. A coupler according to claim 1 wherein said service port collar is provided with a lip which extends radially outwardly from said collar.

* * * * *